June 9, 1953 M. R. SUTER 2,641,276
DOUBLE-ACTING VALVE
Filed July 24, 1951 2 Sheets-Sheet 1

INVENTOR
MENNO R. SUTER,
BY Henry H. Snelling
ATTORNEY

June 9, 1953　　　M. R. SUTER　　　2,641,276
DOUBLE-ACTING VALVE
Filed July 24, 1951　　　2 Sheets-Sheet 2
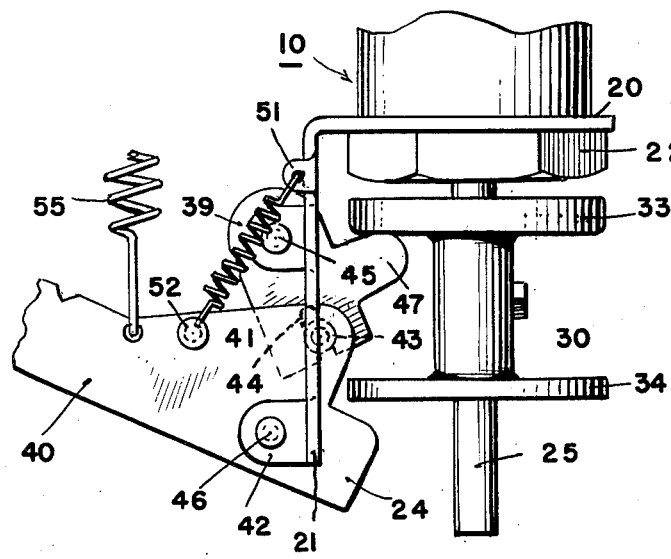
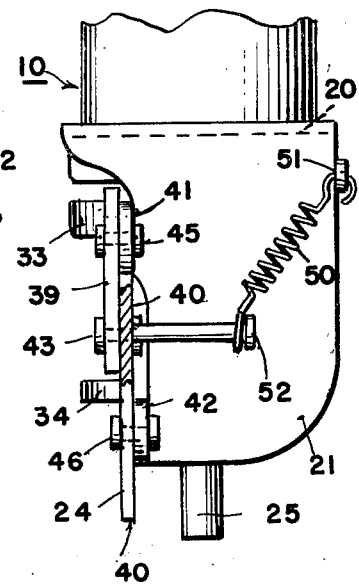
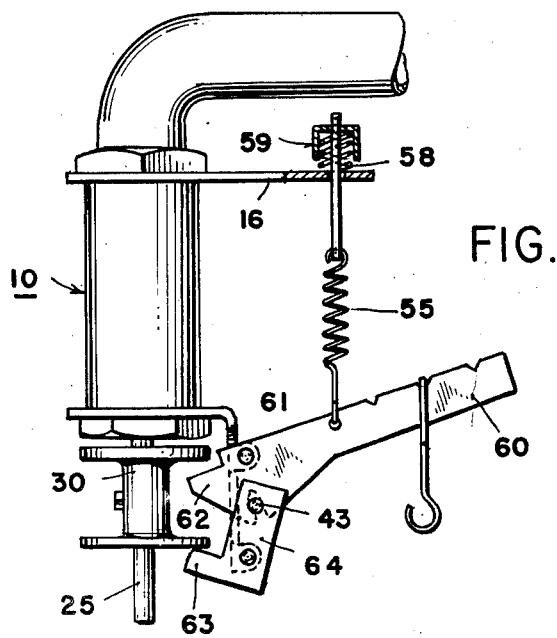
INVENTOR
MENNO R. SUTER,
BY Henry H. Snelling
ATTORNEY Patented June 9, 1953

2,641,276

UNITED STATES PATENT OFFICE 2,641,276

DOUBLE ACTING VALVE

Menno R. Suter, Harrisonburg, Va., assignor to Shenandoah Equipment Company, Harrisonburg, Va.

Application July 24, 1951, Serial No. 238,235

12 Claims. (Cl. 137—408)

This invention relates to double acting valves having a single seat, the closure element at all times opposing the water pressure entering thru the inlet port, and has for its principal object the provision of an extremely simple valve having this double action feature and one especially suited for use with poultry fountains.

A further object of the invention is to provide operating means for a valve stem in which two levers, one of which supports a variable load, have an action resembling somewhat a toggle and in which each lever has a camming tooth engaging two spaced camming surfaces movable with and preferably substantially integral with the stem of the valve.

A further object of the invention is to provide a hollow valve stem which has a port closure at its upper end and has side openings thru which the water which has entered thru the inlet port may pass to an extension, well outside of the valve body, discharging as for example to a poultry fountain pan.

A still further object of the invention is to provide a valve stem as just mentioned in which air is admitted between the two ends and the air entry opening is further utilized for carrying away any water that might possibly leak between the valve stem and the valve body in which the stem snugly fits but slides.

Another object of the invention is to provide two springs of unequal strength to balance the load-carrying lever so positioned that as the load increases the heavier spring will carry more and more of the load and the lighter spring will finally carry no portion of the load.

In poultry fountains a number of different devices nicely take care of the requirement for maintaining in the drinking pan a definite quantity of water and some of these valves have means whereby when the pan is entirely removed the water is shut off. In practice the objection to these has been that when we shut off the valve by means of water pressure, some additional means must be used to start the flow with an empty pan because while the device works nicely with the pan nearly full, the pressure of the water is frequently so great that the empty pan will not kick the valve off of its seat where the water pressure holds the valve to its seat. The usual practice is to place a stick against the valve body in some way so as to hold down the operating lever. It is the object of this invention to eliminate the need for such make-shift and to insure that the valve will start operating just as soon as the pan has been returned to the poultry fountain.

In the drawings:

Figure 2 is a fragmentary elevation viewed at 180° from Fig. 1.

Figure 3 is a fragmentary elevation looking at right angles to the other two figures.

Figure 4 is a modification.

Figure 1:
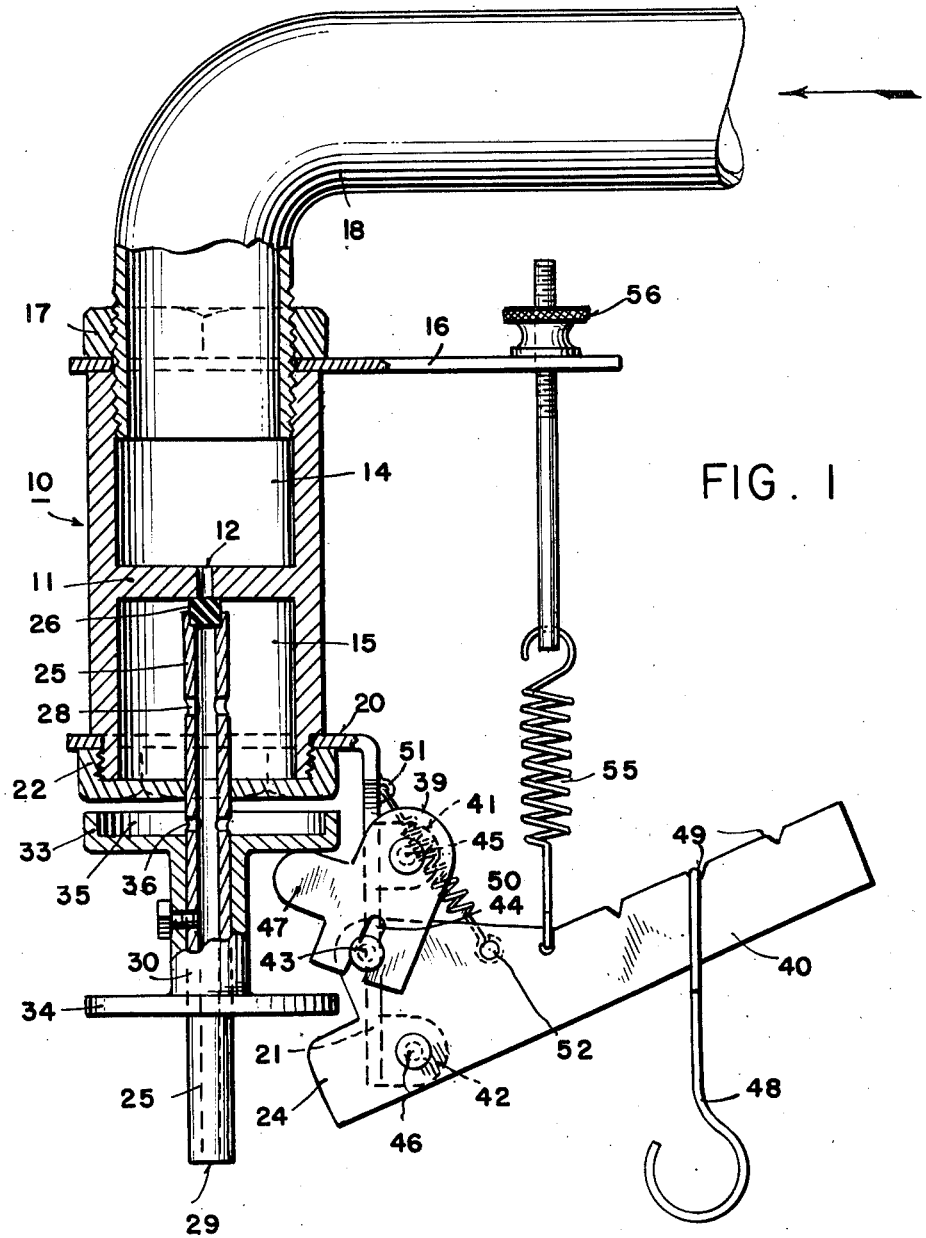
Figure 1 is an elevation partly in section.

The body 10 is a simple piece of tubing having a central partition 11 thru which is bored a sharp edged hole 12 forming the inlet port. In practice the body is made of a solid round bar bored from one side to form the entry chamber 14 and then bored from the other side to form the lower similar chamber or reservoir 15. The top of entry chamber 14 is closed in any way desirable as, for example, by a bracket 16 and a nut 17 thru which the pressure water intake pipe 18 passes. The bottom of the chamber 15 is closed by a plate 20 integral with similar vertical plate 21 forming together a bracket which is secured to the body by a nut 22. A tubular valve stem 25 slides snugly thru the nut 22 and into the reservoir 15. A closure element such as the rubber disk 26 engages the entry port 12 at its bottom so when the tube 25 is in elevated position the port 12 is closed but at such time, as at other times, water may pass into the hollow stem 25 thru the openings 28 and be discharged at the bottom 29 of the stem.

The valve stem 25 carries, integral or not, a pair of spaced camming surfaces very conveniently made by securing a spool 30 to the stem or tube somewhat below the bottom of the tubular body 10. The spool has an upper collar 33 and a lower collar 34, the former preferably being recessed to form a basin 35. The valve stem or tube 25 has one or more holes 36 thru it in a position to draw in air and also to discharge thru the exit 29 any water that may have seeped between the tube 25 and the nut 22.

The means for engaging the two spaced camming surfaces is conveniently a pair of lever arms 39 and 40 secured respectively to lugs 41 and 42 preferably integral with the bracket 20—21 which may be considered as a portion of the valve body. One or the other of the two lever arms carries a pin such as 43 and the other lever arm has a slot 44 cooperating with it so as to form a loose pivot. The stud 43 in normal position is approximately in a vertical line with the pivots 45 and 46. The upper lever arm 39 has a cam tooth 47 which may engage the bottom surface of the collar 33 of spool 30. The lower lever arm has a cam tooth 24. When either of these two teeth engage the camming surface of the proximate collar the valve stem 25 is lifted and the closure 26 is moved against its seat thereby shutting off the water.

Spring means are provided to hold the outer end of the lower lever arm 40 elevated unless moved in the opposite direction. This lever arm normally carries a variable load as by means of a bail 48 which can engage any one of a plurality of recesses 49 in the top of the long and lower lever arm. For light pans, for example, up to a quart of water capacity, a very tiny spring 50 is ideal, this spring being fast to the bracket as at 51 at one end and engaging a stud 52 on the lever arm 40 at its other end. For larger pans to form a quart to a couple of gallons or more, the spring 55 is used. The device is sold with both springs in place but with the smaller capacities, the regulating nut 56 is simply loosened and entire control is given to light spring 50. With pans just above a quart, the two springs cooperate to hold the free end of the lever arm 40 elevated.

The operation of the valve is as follows: With the variable load such as the water pan of the poultry fountain removed, the spring 50 with or without the spring 55 will elevate the free end of the lever arm 40 which turns about its pivot 46. The central pin 43 consequently moves the lower portion of the upper lever arm 39 toward the spool and causes the tooth 47 to engage the collar 33 and raises the valve stem 25 to closed position. When the empty pan is hung from the lever arm as by the bail 48, the weight of the empty pan moves the spring 50 and this lowers lever arm 40 so that the pivot pin or stud 43 moves clockwise as seen in Fig. 1. The pressure of the water plus the weight of the stem and its associated parts lowers the stem and water passes between the port 12 and the top of the stem which preferably has a resilient disk such as 26. Water therefore passes through port 12 into reservoir 15 and in the hollow of tube 25 thru the openings 28 passing downwardly the entire length of the tube and discharging at 29, sucking in air as the water passes holes 36. When a sufficient amount of water has been discharged into the pan, the bail 48 pulls lever arm 40 in clockwise direction which causes cam tooth 24 to engage collar 34 and lift the valve stem or tube 25 to closing position.

In Figure 4 is shown a modification which follows closely the general features of the previously described valve and from a manufacturing standpoint has the desirable features of providing a better location for the lighter of the two springs and shortening the distance from the adjusting nut to the longer lever arm by the mere reversal of the two prongs which operate the cam surfaces of the valve stem 25. In this form of the invention the light spring 50 rests on the bracket 16 and urges the hollow nut 59 upward to turn the lever arm 60 about its pivot 61, lowering the cam tooth 62 on the longer lever arm, moving pivot 43 away from the spool 30 and elevating the cam tooth 63 on the shorter lever arm 64 here positioned below the lever arm 60. With a variable load too heavy for the spring 50 the nut 59 seats on the bracket 16 and the heavier spring 55 balances the arm 60 and its load.

What I claim is:

1. A valve comprising a body having a water inlet port and a chamber beneath the port, an axially movable tube extending into the body and having an opening in communication with the chamber and an exit below the chamber, a port closure movable with the tube, two lever arms each having a pivot fixed with respect to the body and loosely pivoted together between their individual pivots, said loose pivot having a movement toward or away from the axis of the tube, two camming surfaces movable with the tube and spaced along a line parallel to the axis of the movement, a camming tooth on each lever arm to engage the respective proximate cam surface, and spring means to hold the two lever arms in such a position that when a chosen weight is suspended from one of said arms, the port closure is out of contact with the port, whereby an increase in the chosen load will rock the loose pivot in a direction against the urge of the spring means and cause one tooth to elevate the tube to shut off the water by engaging one of the cam surfaces, and an abnormal decrease of the load, as by removing it, will cause the spring means to shift the two levers to move the loose pivot in opposite direction and to cause the other tooth to engage the other cam surface and thereby close the port against the water pressure.

2. The valve of claim 1 in which the spring means includes a lighter spring, a heavier spring, and means for adjusting the tension of the heavier spring.

3. The valve of claim 2 in which the adjusting means includes a hollow nut surrounding the lighter spring and a stop member for limiting compression of the lighter spring by limiting movement of the nut.

4. The valve of claim 1 in which the two camming surfaces are surfaces of a spool on the tube, and the upper lever arm supports the load.

5. The valve of claim 1 in which the tube carries a basin for collecting water leaking from the chamber.

6. The valve of claim 5 in which the tube has an air and water intake opening within the margin of the basin to drain the basin thru the tube.

7. The valve of claim 1 in which the tube has an air intake opening below the bottom of the chamber.

8. A valve operator comprising a member movable up and down and having two vertically spaced, parallel camming surfaces, two levers moving about horizontal pivots, each fixed with respect to the upper and lower limits of movement of the member, one pivot being vertically above the other and both laterally spaced with respect to the member, each lever carrying a cam tooth in proximity respectively to the two surfaces to move the member vertically, one of said levers having a slot therein, a stud on the other of said levers sliding in the slot and moving in opposite directions away from a central point in vertical alinement with the pivots of the levers so that as one tooth moves upward the other tooth will move downwardly whereby as one of the levers moves its tooth to engage the proximate cam surface the tooth of the other lever will move away from the other cam surface.

9. The operator of claim 8 in which the upper lever is adapted to support a variable weight and a spring resiliently holds the upper lever in a horizontal position when the weight is at a chosen amount, one tooth moving the body upwardly when the variable weight is above normal and the other tooth moving the body upwardly when the variable weight is abnormally reduced.

10. The operator of claim 9 in which a pair of tandem arranged springs resiliently hold the upper lever in horizontal position, and means are provided to adjust one of the springs and to form a limiting stop for the other spring.

11. In combination a reciprocating spool having two spaced camming surfaces perpendicular to the axis of the spool, a pair of fixed pivots one above the other and both equidistant from said axis, a lever mounted on each pivot and having a cam adapted to engage one of the camming surfaces to move the spool upwardly, and means between the pivots connecting the two levers so that as one turns clockwise the other lever will turn counterclockwise on its pivot, whereby as one of the levers is moved so that its cam will engage the proximate cam surface to move the spool upwardly, the other cam will move away from the other cam surface.

12. The combination of claim 11 with a pair of oppositely urged members pivoted to one lever toward its free end and means to limit upward axial travel of the spool, so that when the two members are balanced in urge the spool will occupy a mid-position and when the free end of said one lever is at either extreme of movement the spool will be at the upward end of its travel along its axis.

MENNO R. SUTER.

References Cited in the file of this patent

UNITED STATES PATENTS

| Number | Name | Date |
| --- | --- | --- |
| 1,753,122 | Kielmeier | Apr. 1, 1930 |
| 2,400,561 | Harris | May 21, 1946 |
| 2,541,622 | Toadvine | Feb. 13, 1951 |